(12) United States Patent
Fenkart et al.

(10) Patent No.: US 8,326,441 B2
(45) Date of Patent: Dec. 4, 2012

(54) CONTROL SYSTEM FOR A PLURALITY OF CONSUMERS ARRANGED IN A DISTRIBUTED MANNER, IN PARTICULAR FOR LAMP OPERATING DEVICES, AND METHODS FOR PUTTING INTO OPERATION

(75) Inventors: Karlheinz Fenkart, Hohenems (AT); Bernhard Klocker, Dornbirn (AT)

(73) Assignee: Zumtobel Lighting GmbH, Dornbirn (AT)

( * ) Notice: Subject to any disclaimer, the term of this patent is extended or adjusted under 35 U.S.C. 154(b) by 1018 days.

(21) Appl. No.: 12/095,443

(22) PCT Filed: Oct. 12, 2006

(86) PCT No.: PCT/EP2006/009879
§ 371 (c)(1),
(2), (4) Date: May 29, 2008

(87) PCT Pub. No.: WO2007/062716
PCT Pub. Date: Jun. 7, 2007

(65) Prior Publication Data
US 2008/0288119 A1 Nov. 20, 2008

(30) Foreign Application Priority Data
Nov. 30, 2005 (DE) .......................... 10 2005 057 068

(51) Int. Cl.
*G05B 11/01* (2006.01)
(52) U.S. Cl. ........................................... 700/22; 700/82
(58) Field of Classification Search .................. 700/22, 700/24, 286, 291, 295, 21, 79, 82
See application file for complete search history.

(56) References Cited

U.S. PATENT DOCUMENTS

| 6,546,435 | B1 | 4/2003 | Yoshimura |
| 7,880,638 | B2 * | 2/2011 | Veskovic et al. ............. 340/4.3 |
| 2003/0227267 | A1 | 12/2003 | Yen |
| 2004/0217718 | A1 * | 11/2004 | Kumar et al. ................ 315/291 |

FOREIGN PATENT DOCUMENTS

| DE | 102004039677 A1 | 12/2005 |
| EP | 0433527 A1 | 6/1991 |
| EP | 0766881 A1 | 4/1997 |
| FR | 2743866 A | 7/1997 |
| WO | 0043966 A1 | 7/2000 |

OTHER PUBLICATIONS

International Search Report for PCT/EP2006/009879, mailed on Jan. 23, 2007.

* cited by examiner

*Primary Examiner* — John R. Cottingham
*Assistant Examiner* — Chad Rapp
(74) *Attorney, Agent, or Firm* — The H. T. Than Law Group

(57) ABSTRACT

In the case of a control system (1) for a plurality of consumers (10) arranged in a distributed manner, in particular for lamp operating devices, having at least one command generator (5), a control line (2) which connects the command generator (5) with each consumer (10) and associated with each consumer (10) a transmission and reception unit (11) provided for communication with the command generator (5), an operating address is allocated to each consumer (10) via which the consumer (10) can be contacted by the command generator (5). In accordance with the invention there is associated with each consumer (10) a memory element (20), separate from the consumer (10), for storing the operating address, wherein the memory element (20) is connected with the associated consumer (10) via the control line (2).

20 Claims, 2 Drawing Sheets

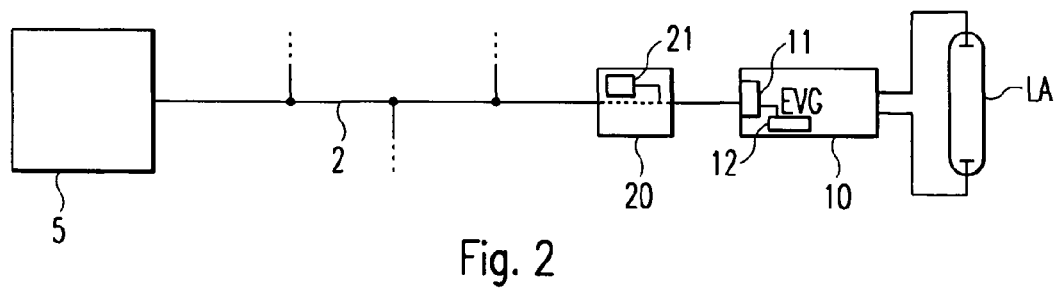
Fig. 2
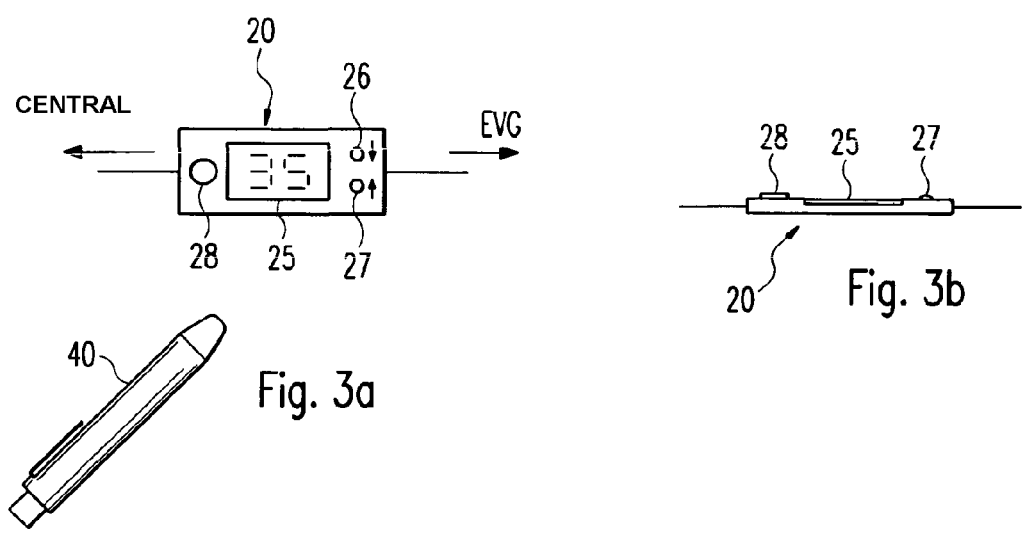
Fig. 3a
Fig. 3b

CONTROL SYSTEM FOR A PLURALITY OF CONSUMERS ARRANGED IN A DISTRIBUTED MANNER, IN PARTICULAR FOR LAMP OPERATING DEVICES, AND METHODS FOR PUTTING INTO OPERATION

FIELD OF THE INVENTION

The present invention relates a control system for operating a plurality of consumers arranged in a distributed manner, in particular for operating lamp operating devices arranged in a distributed manner. Furthermore the present invention concerns a method for the putting into operation of such a control system.

BACKGROUND OF THE INVENTION

As a rule, illumination systems of a modern construction, provided in particular for the illumination of larger buildings or plants, offer not only the option of switching on and of, or setting in their brightness, the luminaires arranged in different regions via the switches or dimmers arranged in the respective regions. Instead there is also the possibility of remotely controlling the luminaires from a central control device. Through this a convenient illumination control is obtained for the illumination of larger buildings or complexes. Such illumination systems therefore normally have one or a plurality of command generators which by means of commands can address and control the decentralised lamp operating devices arranged in different regions and connected to a current supply grid. Often, a communication from the lamp operating devices to the command generator is provided, for example to report back faulty operating states. In this way there is made possible not only a comfortable illumination control but also a reliable monitoring of the condition of the illumination system.

The control of the individual lamp operating devices is carried out via an address assigned to them individually, via which they can be addressed by the central control unit. Thereby preferably there are assigned to the lamp operating devices so-called operating addresses which among other things also take into account the arrangement of the light sources in the different regions of the building to be illuminated. Here there arises supplementarily also the possibility of combining the light sources arranged in the different rooms into groups which can be addressed in common by the central control unit.

Nowadays, control systems for lamp operating devices which make possible an individual control of the devices often work in accordance with the so-called DALI (Digital Adressable Lighting Interface) standard. This is an interface developed by the illumination industry for the conveyance of digital control commands between a central control unit and consumers arranged in a distributed manner. Via a so-called DALI-Bus there can then be connected to a command generator up to 64 luminaires, which luminaires are individually addressable. Since the corresponding lamp operating devices do not have any operating address upon their production and installation in the illumination system this must be allocated in the context of an initialization procedure which has to be carried out in accordance with the DALI-Standard as explained below.

After installation of all lamp operating devices, without consideration of their spatial arrangement, at first the operating devices of the individual luminaires are connected to the DALI-Bus, that is to the control line. The supply of the lamp operating devices with voltage effected thereafter results in every lamp operating device generating an individual random address for itself. The command is then issued by the central command generator that the lamp operating devices report with their random address, through which there is stored internally at the command generator a list of all devices, which also contains the information about the random addresses via which the devices are respectively contactable.

Since this random address does not yet, however, take into account the spatial arrangement of the lamp operating device, in a following step there is the allocated the respective operating address provided for later operation. This is effected in that at first the central command generator calls a first random address, which has the consequence that the corresponding luminaire identifies itself, thus for example illuminates. Now a person must determine in which room this luminaire is located. As soon as the position is established, a corresponding return report is effected to the central station. A further person then enters the location and the group of the reporting luminaire into the control device, which has the consequence that a suitable operating address is then assigned to this luminaire. One after another, in this way all random addresses are handled until an operating address has been assigned to all luminaires. This is stored respectively in a corresponding memory of the lamp operating device.

Comparable procedures for assigning operating addresses for lamp operating devices in larger illumination systems are known from EP 0 766 881 A1 or EP 0 433 527 A1. All these known methods are based on the principle that at first the lamp operating devices are called upon for identification on the basis of an original or random address not taking into account the position, wherein after determination of the actual position of the luminaire a new operating address is then assigned to this luminaire.

These known methods for initializing larger illumination systems are in this respect problematic that finding a luminaire which is instantly identifying itself can be very effortful; today, however, these methods are still used. Furthermore they also have, however, the disadvantage that the regular operating address, which was distributed in the context of the initialization procedure from the central command generator, is itself stored in each case in the lamp operating device in question. If an exchange of the corresponding luminaire with the lamp operating device is now required or the lamp operating device is to be exchanged alone, the information about the actual operating address is then lost. This is not a problem in the event that one single lamp operating device has to be exchanged since this can be identified from the central station in relatively simple manner and can be provided with a new operating address—namely the old regular operating address. Should, however, a plurality of lamp operating devices be replaced at the same time, which in the case of maintenance works in larger illumination systems may well be the case, there arises uncertainty. It cannot then then any longer be determined from the central station which exchanged lamp operating device should have which regular operating address. In this case as a rule the entire facility must be programmed anew to assign suitable operating addresses to all devices again.

SUMMARY OF THE INVENTION

The present invention is now based on the object of counteracting the disadvantages described above. In particular there is to be provided a control system for a plurality of consumers arranged in a distributed manner with which the assignment and storage of the operating addresses, in particular after maintenance work, is effected in optimized manner.

The object is achieved by the invention indicated in the independent claims. Advantageous developments of the invention are subject of the dependent claims.

A first aspect of the present invention is based on the concept of assigning a separate memory element to each consumer, which is provided for storing the corresponding operating address of the consumer and is connected to the respective consumer via the control line of the control system.

Thus, in accordance with the first aspect of the present invention there is proposed a control system for a plurality of consumers, in particular for lamp operating devices, arranged in a distributed manner, wherein the control system has at least one command generator, a control line which connects the command generator with the consumers, and a transmission and reception unit associated with each consumer and provided for communication with the command generator, and wherein an operating address is assigned to each consumer via which the consumer is contactable by the command generator. In accordance with the invention it is provided that a memory element separate from the consumer is associated with each consumer, for storing the operating address, wherein the memory element is connected to the respective consumer via the control line.

The advantage of the solution in accordance with the invention consists in that, in the case that a consumer or a lamp operating device must be exchanged, the memory element separate therefrom remains in location in the system. If this is connected to the control system after the exchange of the consumer, then the memory element enters into contact with the consumer automatically and provides this with the correct operating address. Even after the exchange of a plurality of consumers correspondingly no new installation of the control system is required since the correct operating addresses are assigned to the consumers again automatically. Through this possibly necessary maintenance works on the control system are simplified considerably since no centralized new allocation of operating addresses is required after an exchange of the individual devices.

The allocation of addresses upon the first putting into operation of the system can, with the system in accordance with the present invention, be effected in manner known to date in that the individual consumers identify themselves initially with provisional original or random addresses and are then provided with regular operating addresses in the context of an initialization process as described in the introduction. The function of the separate memory element in accordance with the invention then consists in supplementarily storing the operating addresses assigned the consumers, in order to transmit the originally provided operating address to the new device in the case of a later exchange of the consumer.

In accordance with a preferred embodiment of the present invention the memory element has, however, in addition input elements for manually entering an operating address to be assigned to the consumer. In this case the effortful initialization procedure then is no longer required for allocating the operating addresses for the first time. Instead a consumer can be assigned an operating address in a simple manner, in that this is entered manually into the memory element and the memory element then transmits corresponding information to the consumer. In this case it is no longer required to seek a luminaire identifying itself with its provisional original or random address. Instead it is merely required to connect the correspondingly programmed memory elements to the bus line system or the control line, in order to allow this to make contact with the respective consumer.

The concept of carrying out the allocation of operating addresses by means of a memory element into which at first the desired operating address is programmed manually and is then connected with the consumer, can otherwise be effected independently of whether the memory element is connected to the consumer via the control line or is directly connected thereto.

In accordance with a second aspect of the present invention there is correspondingly proposed a control system for a plurality of consumers arranged in a distributed manner, in particular for lamp operating devices, which has at least one command generator, a control line which connects the command generator with each consumer, and associated with each consumer a transmission and reception unit provided for communication with the command generator, wherein an operating address is assigned to each consumer via which the consumer is contactable by the command generator, and wherein in accordance with the invention a separate or separable memory element is associated with the consumer for storing the operating address, which memory element has input elements for the manual input of an operating address assigned the consumer.

Further, this aspect of the present invention also relates a method for the putting into operation of a control system for a plurality of consumers arranged in a distributed manner, in particular for lamp operating devices, wherein within the scope of the method each consumer is assigned an operating address via which the consumer is contactable by the command generator, and wherein the allocation of addresses is effected in that the operating addresses of the consumers are in each case manually entered into memory elements which are respectively connected to the corresponding consumers.

Advantageous developments of the two inventive ideas described above relate in particular to the configuration of the memory element.

Thus it is preferably provided that in the event that the memory element is connected to the respective consumer via the control line, the memory element is provided during operation with energy via the control line of the control system. Thus the memory element works extensively in a non-powered manner and in comparison with the actual consumers of the control system takes considerably less power. This has the consequence that the memory element is exposed to a lower load and correspondingly has an extremely long operating life. The memory element can therefore "survive" without problem the exchange of a plurality of consumers.

Since, however, during the manual input of the operating address there is an increased energy consumption, it is preferably provided that the memory element has a connection to the external energy supply for the programming procedure. This connection can for example be formed by means of at least one connection of the memory element to the control line(s) of the system, wherein then during programming this connection is connected to an external energy supply source. As an alternative to this, a separate connection can also be provided via which the energy supply is preferably inductively effected during the manual input of the operating address.

Preferably the memory element has further an indicator or a display for the representation of the programmed-in or stored operating address, wherein it can be provided that the indicator or the display is activated exclusively during the manual input of the operating address. In this way the energy consumption during the later operation is reduced considerably.

Altogether, there is this provided a control system for a plurality of consumers arranged in a distributed manner which due to the use of the memory elements in accordance with the invention is considerably more maintenance-friendly. It in particular it is no longer required, after a exchange of a plurality of consumers, to assign new operating addresses to these within the context of a complicated assignment procedure. In the event that the memory element has input elements for the manual input of an operating address, even a particularly simple initialization of the complete system is made possible.

BRIEF DESCRIPTION OF THE DRAWINGS

Below, the invention will be explained in more detail with reference to the accompanying drawings. There is shown:

FIG. 2 a section of the control system illustrated in FIG. 1 and

FIGS. 3a and 3b views of a memory element in accordance with the invention.

DETAILED DESCRIPTION OF THE INVENTION

Figure 1:
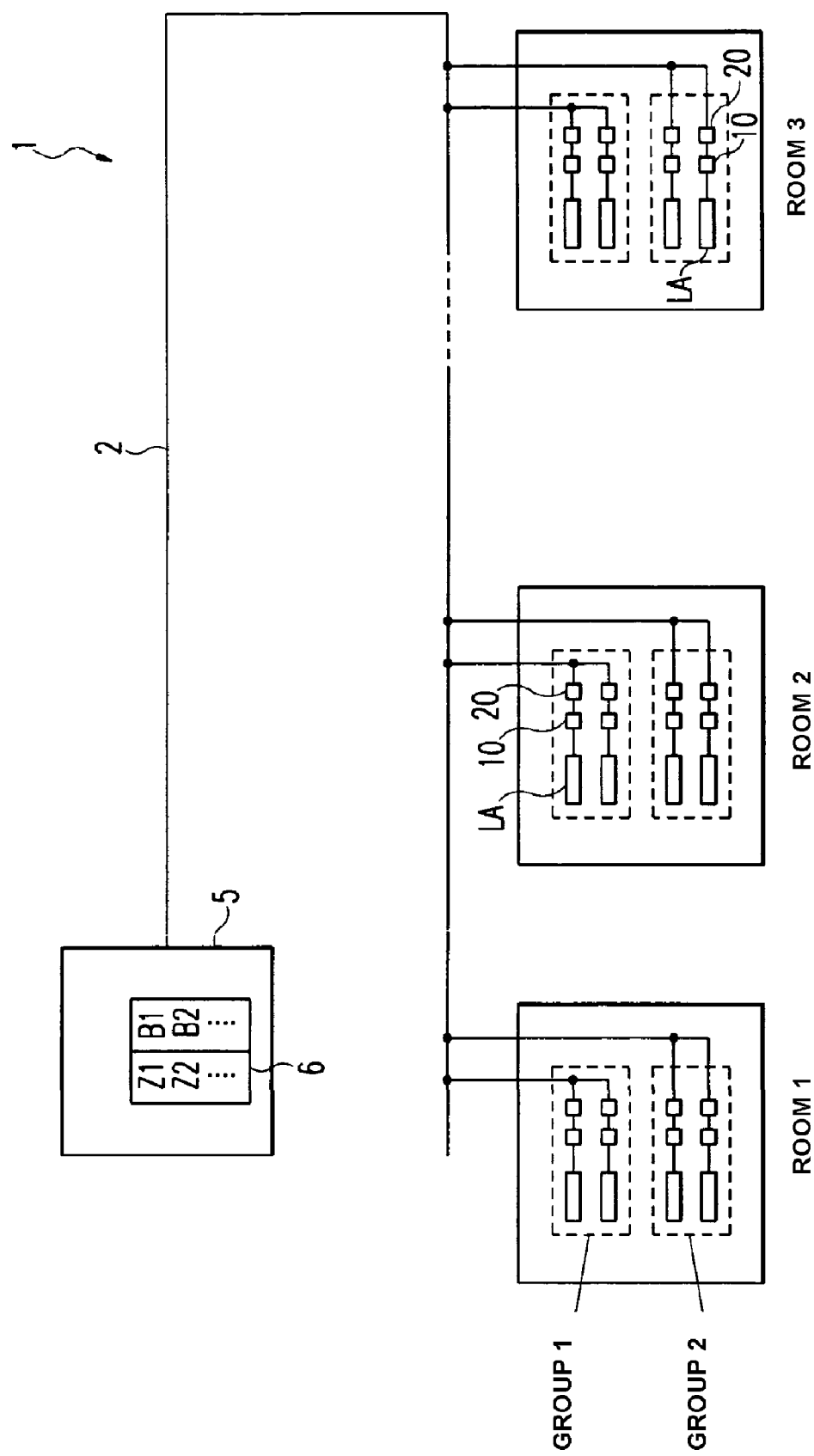
FIG. 1 the basic construction of a control system in accordance with the invention for a plurality of consumers arranged in a distributed manner.

The invention will be explained below with reference to the example of a larger illumination system. It has to be said, however, that the use of the memory elements in accordance with the invention is in no sense restricted to control systems for lamp operating devices or luminaires. Instead, corresponding memory elements can always then be used when in larger control systems consumers are individually contactable from a central station via an operating address and it is to be ensured that a consumer is automatically addressable again, under the correct address, also after an exchange thereof. For example the memory elements in accordance with the invention could be put to use generally in building control systems which are provided for remotely controlling the most different devices. Under the term consumer there thus also fall, besides lamp operating devices, for example also Venetian blinds, heating or air-conditioning units or monitoring facilities.

The illumination system illustrated in FIG. 1 and provided generally with the reference sign 1 is based on a bus line system provided with the reference sign 2, which connects a central command generator 5 with individual consumers. The consumers are in the present case formed by luminaires which on the one hand include a lamp operating device 10 and on the other hand a lamp LA connected with the lamp operating device 10. All lamp operating devices 10 are connected to the bus line 2, and have for this purpose a transmission and reception unit to be described below in more detail, via which a data interchange with the central command generator 5 is made possible. Preferably the lamp operating devices 10 are electronic ballasts (EVGs), which one operate gas discharge lamps LA, in particular fluorescent lamps, arranged downstream thereof.

As can be understood from the representation in FIG. 1, the different lamp operating devices 10 are arranged in different rooms. In each case two lamp operating devices each are combined to a group so that they can if applicable be controlled as a unit by the central command generator 5. Furthermore, however, there is also to be the possibility of controlling every single lamp operating device 10 individually. Thus, the central command generator 5 should have the possibility of switching on and off, or adjusting in its brightness, each luminaire individually.

The conveyance of the control commands of the central command generator 5 to the individual luminaires is effected preferably in accordance with the so-called DALI-standard. This is an interface specifically developed by the lighting industry for the conveyance of digital control commands, which opens up the possibility of switching on and off individual luminaires, and of transmitting dimming value commands to regulate the brightness virtually in a step-less manner. This DALI-standard has gained ever wider acceptance lately, since through this a convenient remotely controlled illumination control can be realized. It has to be said, however, that the present invention in principle can be used in the case of every kind of digital command conveyance.

An individual control of the individual luminaires of the control system 1 is made possible in that an operating address is assigned to each lamp operating device 10. There is the possibility, for example in the case of the DALI-standard, of connecting up to 64 lamp operating devices with a central command generator 5 via the bus lines 2. Thereby, each lamp operating device 10 has an operating address of its own, which forms a component of the commands transmitted by the command generator 5. Correspondingly each lamp operating device 10 can recognize autonomously whether or not a command issued on the bus line 2 concerns it and it should carry out the command. Supplementarily thereto, in the case of the DALI-standard there is also the possibility of assigning group addresses to the individual lamp operating devices, after they have been assigned individual operating addresses.

Since the lamp operating devices 10 do not yet have any operating addresses upon first installation of the illumination system 1, these must first be assigned to them in the context of an initialization procedure. In the case of the DALI-standard the following procedure is provided for this:

a) After the putting into operation of the system, initially all lamp operating devices generate a random address in response to a corresponding requirement from the command generator. These random addresses are transmitted by all lamp operating devices to the central command generator 5, which initially determines therefrom the lowest random address and under this random address requires the corresponding lamp operating device to identify itself.

b) The identification of the lamp operating device is effected in that the associated lamp is controlled in a suitable manner, thus in comparison with the other lamps is either switched on or off or modulated in its brightness.

After, in this way, the position of the lamp operating device has been determined, a corresponding operating address can be entered manually into the command generator 5 which then transmits this operating address to the lamp operating device, which writes this address into a corresponding memory.

c) Subsequently, also all further lamp operating devices are contacted in this way and, after their corresponding identification, provided with an operating address. The control unit 5 hereby internally stores a table 6 with the allocated operating addresses. Further, there can then also be transmitted to the lamp operating devices—so far as this is desired—an additional group address.

Although this procedure for the initialization and first issuance of the operating addresses for the lamp operating devices has proved itself, it is however effortful despite everything, since it cannot be foreseen which lamp operating device will next identify itself. Thus there can indeed arise the case that all rooms must be searched one after another over until the luminaire identifying itself is determined. This effortful procedure is still justified upon first putting into operation of the system 1; however, at later times it should be ensured that the lamps permanently retain the operating addresses assigned to them.

Hereby the problem arises, however, that the lamp operating devices 10 must be replaced from time to time, since they have exceeded their permitted operating time or possibly defects have appeared. If a lamp operating device 10 is now replaced, then it is replaced by one which is as good as new, which of course has no operating address yet. In the event that merely one single device was replaced this can be assigned a new operating address in a relatively rapid manner. If, however, more than two devices should be exchanged at the same time there is then in turn the problem that initially these must firstly be localised and identified, in effortful manner.

To avoid these difficulties it is now proposed in accordance with the invention to assign to the lamp operating devices 10 in each case a memory element 20 which is used for the supplementary storage of the assigned operating address. As will be explained below it can in this way be ensured that also upon an exchange of the associated lamp operating device this automatically again receives the correct operating address.

Firstly, with reference to FIG. 2, there will be explained a section of the control system 1 in accordance with FIG. 1. Hereby there is shown the connection of the central command generator 5 via the bus line 2 to the lamp operating device 10, which is formed by an electronic ballast. As has already been explained, the lamp operating device has a transmission and reception unit 11 via which the device is connected to the bus line system 2 and which is responsible for the data interchange with the central command generator. The control commands received by the transmission and reception unit 11 are passed on to a—not illustrated—control unit of the ballast 10 which controls the gas discharge lamp 11 according to these commands. Here, it is a prerequisite that the corresponding control command, due to the included operating or group address, is addressed to the lamp operating device 10. The lamp operating device 10 has for this purpose an internal memory 12 in which the assigned operation and group addresses are stored.

With respect to conventional illumination systems the system in accordance with the invention differs in that there is associated with the lamp operating device 10 a memory element 20 which also has a memory 21. It is main task of the memory element 20 also to store the operating address assigned to the associated lamp operating device 10. This memory element 20 contains, so to speak as a backup, the address information which is stored in the memory 12 of the lamp operating device 10. For the regular operation of the system this does not have an immediate effect since a communication between the command generator 5 and transmission and reception unit 11 of the lamp operating device 10 is still effected, wherein the memory element 20 preferably has no influence on the data interchange. The bus line 2 extends correspondingly through the memory element 20. As an alternative to this the memory element 20 could however also actively pass on received data.

If the lamp operating device 10 is now exchanged due to a maintenance procedure, now no effortful new allocation of an operating address is needed. Instead, the memory element 20 comes into contact with the new operating device 10 and transmits to it the operating address assigned the previous device. So the new device can immediately take on the function of the earlier device.

It has to be taken into account that in this first embodiment the memory element 20 is not connected physically with the lamp operating device 10 but merely via the bus line 2. Thus in turn the communication between the two units is carried out exclusively via this bus line 2. So that the memory element 20 can now communicate with the replaced lamp operating device 10 and transmit the stored operating address thereto, it is in turn firstly required that the memory element 20 can contact the new pre-lamp operating device 10 via a provisional address. Hereby the circumstance is used that lamp operating devices which work according to the DALI-standard, after their first connection to a larger illumination system or to the power supply, automatically generate a provisional original or random address, which is now recognised by the memory element 20 connected in series with the lamp operating device 10. The memory element 20 also saves this provisional address and uses this to contact the lamp operating device 10 in the following step and inform it of the previously stored regular operating address. The advantage of this procedure consists in that the information exchange and in the end the conveyance of the actual operating address is effected without assistance of maintenance personnel. Therefore also a larger number of lamp operating devices can be replaced without problems within the illumination system 1 and are responsive thereafter under the usual operating addresses.

A further substantial characteristic of the memory element 20 consists in that this works with little power and is supplied with energy exclusively via the bus line 2 of the illumination system 1. Unlike the lamp operating device, which takes considerably more power, and for this is connected to a separate—not illustrated—current supply grid, the memory element 20 works extensively power-less or with little power which has the consequence that damage to the memory element 20 in the course of the time occurs considerably more seldom. Through this it is ensured that the memory element 20 stores the operating address for the accompanying lamp operating device also over a longer time period and again makes this available even after a repeated exchange of the operating device. Hereby it is of advantage that the memory element needs energy merely during communication with the accompanying lamp operating device, whilst in further operation it behaves passively.

In the case of the embodiment which has been described with reference to FIGS. 1 and 2, the original initialization process of the illumination system was carried out in a classic manner. This means that all lamp operating devices 10 were assigned an operating address from the central station after their corresponding identification. A solution alternative to this is illustrated now in FIGS. 3a and 3b which however is in turn based on the concept of using an additional memory element.

The unusual feature of the memory element 20 illustrated in FIGS. 3a and 3b consists in that this offers the possibility of manually entering an operating address for the associated lamp operating device. To this end the memory element 20 illustrated in FIGS. 3a and 3b has input elements 26 and 27 in the form of pushbuttons which make possible a step-wise adjustment of the operating address represented on a display 25. With the aid of this measure it is no longer required now to carry out the initialization and putting into operation of the illumination system in the manner described in the introduction. Instead the allocation of the operating addresses to all of the operating devices can be effected now in a simple manner in that in each case a corresponding memory element is provided with the desired operating address manually and then the memory element 20 is connected to the bus line system 2. The outlay is considerably lesser than in the case of the classic initialization procedure since it is no longer required to seek the luminaire instantly identifying itself. Instead, in a systematic manner each lamp operating device can be assigned an operating address corresponding to its position in the building to be illuminated, whereby the resulting effort for this is considerably lesser. Of course there would also be the possibility of first connecting the memory element 20 to the bus 2 and then programming in the operating address.

The concept of the allocation of addresses for the lamp operating devices by the manual programming of a memory element is independent of whether the memory element 20 is directly connected to the lamp operating device 16 or is connected with this merely via the bus line. A corresponding programming would make sense also for example when the memory element is physically, that is directly, connected to the lamp operating device in advance or subsequently.

Since, however, it is still, as previously, desired that the memory element works extensively in a power-less manner, additional measures are provided now to supply the memory element 20—uncoupled from the bus system 2 or the lamp operating device 10—with energy during the programming of the operating address. In the case of the embodiment illustrated in FIGS. 3a and 3b an easy to handle energy supply element is provided in form of a battery-operated supply pen 40, which with its tip can be connected to a corresponding connection 28 of the memory element 20. As soon as the pen 40 is inserted into the corresponding recess of the connection 28 an energy transfer to the memory element 20 is effected inductively, which is sufficient to carry out the programming. Further to save energy it can be provided that the display 25 is active merely during the programming process.

Alternatively to the special connection 28 for the energy supply, also the terminals of the memory element 20 for connection to the bus line system 2 could be used for the energy supply. Preferably there is then arranged within the memory element 20 a small energy storage circuit in form of a capacitor which also in the case of a switched off bus line system guarantees a sufficient voltage supply, at least for a predetermined time period, for the storage of the operating address. It is, however, of substance that the memory element does not represent any power supply for the subsequently arranged lamp operating device.

Altogether, it remains correspondingly to note that through the present invention a new possibility for the allocation of addresses or address storage in a larger illumination system is provided. Hereby it is firstly ensured that even after an exchange of the corresponding consumer that this automatically again receives the regular operating address assigned thereto. With the aid of the supplementary possibility of the manual programming of the memory element even a completely new and elegant possibility for the allocation of operating addresses is provided.

The invention claimed is:

1. A control system (1) for a plurality of consumers (10) arranged in a distributed manner, comprising:
   at least one command generator (5);
   a control line (2) which connects the command generator (5) with each consumer (10); and
   associated with each consumer (10), a transmission and reception unit (11) provided for communication with the command generator (5), and a first memory (12),
   wherein an operating address is allocated to each consumer (10) via which the consumer (10) is contactable by the command generator (5),
   wherein there is associated with each consumer (10) a dedicated backup memory element (20), separate from the consumer (10) such that there is one dedicated backup memory element (20) for each consumer (10), for storing the operating address, wherein the memory element (20) is connected with the associated consumer (10) via the control line (2),
   wherein the control line (2) extends through the dedicated backup memory element (20).

2. The control system according to claim 1, wherein an energy supply of the dedicated backup memory element (20) is effected during an operation of the control system (1) via the control line (2).

3. The control system according to claim 1, wherein the dedicated backup memory element (20) comprises input elements (26, 27) for manually entering an operating address assigned to the associated consumer (10).

4. A control system (1) for a plurality of consumers (10) arranged in a distributed manner, comprising:
   at least one command generator (5);
   a control line (2) which connects the command generator (5) with each consumer (10); and
   associated with each consumer (10) a transmission and reception unit (11) provided for communication with the command generator (5), and a first memory (12),
   wherein an operating address is allocated to each consumer (10) via which the consumer (10) is contactable by the command generator (5),
   wherein there is associated with each consumer (10) a dedicated backup memory element (20), separate or separable from the consumer (10) such that there is one dedicated backup memory element (20) for each consumer (10), for storing the operating address, wherein the dedicated backup memory element (20) comprises input elements (26, 27) for manually entering an operating address assigned to the associated consumer (10).

5. The control system according to claim 3, wherein the dedicated backup memory element (20) comprises a connection (28) for external energy supply during the manual input of the operating address.

6. The control system according to claim 5, wherein the connection for external energy supply is formed by means of at least one connection of the dedicated backup memory element (20) to the control line (2) of the control system (1).

7. The control system according to claim 5, wherein the energy supply is effected inductively during the manual input of the operating address.

8. The control system according to claim 1, wherein the dedicated backup memory element (20) comprises an indicator or a display (25) for a representation of the stored operating address.

9. The control system according to claim 4, wherein the dedicated backup memory part (20) comprises an indicator or a display (25) for representation of the stored operating address which is activated only during the manual input of the operating address.

10. The control system according to claim 1, wherein the data transmission is effected according to a DALI-standard.

11. A dedicated backup memory element (20) for use in a control system (1) for a plurality of consumers (10) each having a first memory (12) such that there is one dedicated backup memory element(20) for each consumer(10), said consumers (10) are arranged in a distributed manner, to which operating addresses are assigned via which they are contactable by a command generator (5) of the control system (1) via a bus line (2),
   wherein the dedicated backup memory element (20) comprises a connection means for connection with a consumer (10) of the control system (1) and a memory (21) for storing the respective operating address, and wherein the connection means make possible a connection of the memory element (20) to the bus line (2), wherein the bus line (2) extends through the dedicated backup memory element (20).

12. The dedicated backup memory element according to claim 11, wherein the memory element (20) comprises input elements (26, 27) for manually entering an operating address assigned to the associated consumer (10).

13. A dedicated backup memory element (20) for use in a control system (1) for a plurality of consumers (10) each having a first memory (12) such that there is one dedicated backup memory element(20) for each consumer(10), said consumers (10) are arranged in a distributed manner, to which operating addresses are assigned via which they are contactable by a command generator (5) of the control system (1) via a control line (2), wherein the memory element (20) comprises:
- a connection means for connection with a consumer (10) of the control system (1);
- a memory (21) for storing the respective operating address; and
- input elements (26, 27) for manually entering an operating address assigned to the associated consumer (10)
wherein the control line (2) extends through the dedicated backup memory element (20).

14. The dedicated backup memory element according to claim 12, wherein the memory element (20) comprises a connection (28) for external energy supply during the manual input of the operating address.

15. The dedicated backup memory element according to claim 14, wherein the connection for external energy supply is formed through at least one connection of the memory element (20) to a control line (2) of the control system (1).

16. The dedicated backup memory element according to claim 14, wherein the energy supply is effected inductively during the manual input of the operating address.

17. The dedicated backup memory element according to claim 11, wherein the memory element (20) comprises an indicator or a display (25) for a representation of the stored operating address.

18. The dedicated backup memory element according to claim 13, wherein the memory part (20) comprises an indicator or a display (25) for representation of the stored operating address which is activated only during the manual input of the operating address.

19. A method for putting into operation a control system (1) for a plurality of consumers (10) each having a first memory (12), said consumers (10) are arranged in a distributed manner, comprising the steps of:
- assigning an operating address to each consumer (10), via which the consumer (10) is contactable by a command generator (5);
- dedicating a backup memory element (20) to each consumer (10);
- programming the operating addresses into the dedicated backup memory elements (20) which are connected to the corresponding consumer (10) or are connected after the input of the operating addresses.

20. The method according to claim 19, wherein the dedicated backup memory elements (20) are connected with the corresponding consumers (10) in each case upstream in a control line system (2) connecting all consumers (10).

* * * * *